(12) United States Patent
Hammacher (10) Patent No.: US 9,409,724 B2
(45) Date of Patent: Aug. 9, 2016

(54) DEVICE AND METHOD FOR CONVEYING LUMPY PRODUCTS

(75) Inventor: Heinz-Peter Hammacher, Bamberg (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 0 days.

(21) Appl. No.: 14/394,052

(22) PCT Filed: Apr. 12, 2012

(86) PCT No.: PCT/EP2012/056702
§ 371 (c)(1),
(2), (4) Date: Oct. 10, 2014

(87) PCT Pub. No.: WO2013/152798
PCT Pub. Date: Oct. 17, 2013

(65) Prior Publication Data
US 2015/0068869 A1    Mar. 12, 2015

(51) Int. Cl.
*B65G 47/26* (2006.01)
*B65G 47/31* (2006.01)
(Continued)

(52) U.S. Cl.
CPC .............. *B65G 47/31* (2013.01); *B65B 23/14* (2013.01); *B65B 35/205* (2013.01);
(Continued)

(58) Field of Classification Search
CPC ........ B65G 47/08; B65G 47/14; B65G 47/19; B65G 47/29; B65G 47/31; B65G 47/841
USPC .............. 198/418.7, 419.1, 419.2, 419.3, 426
See application file for complete search history.

(56) References Cited

U.S. PATENT DOCUMENTS 3,194,382 A * 7/1965 Nigrelli ................. B65G 47/088
                                                            198/418.1
4,098,392 A * 7/1978 Greene ................... B65G 47/32
                                                            198/419.3
(Continued)

FOREIGN PATENT DOCUMENTS

DE        2143910      3/1973
DE     102010041346   3/2012
(Continued)

OTHER PUBLICATIONS

International Search Report for PCT/EP201/056702 from international Bureau; Searching Authority: European Patent Office.

*Primary Examiner* — Douglas Hess
(74) *Attorney, Agent, or Firm* — Cislo & Thomas, LLP (57) ABSTRACT

The invention creates a single-track or multiple-track device and a corresponding method for conveying lumpy products in such a way that the products are separated from a product stream on each of the tracks and are subsequently conveyed further spaced apart uniformly and/or in groups. For this purpose, arrangements for supplying the products as a single-row product stream are provided in each track as well as arrangements for discharging the separated products distanced from one another in a row, wherein the products are transferred from the supplying arrangements to the discharging arrangements. Arrangements for conveying the products are provided in each track in the area of the transfer from the supplying arrangements to the discharging arrangements and have driver arrangements, which are mounted so as to be pivotable in a controlled manner in the conveying direction of the products and which intervene between two successive products in the supplied product stream in such a way that said arrangements guide the products during the transfer from the supplying arrangements to the discharging arrangements in such a way that the products are separated from the product stream and are conveyed further at uniform distances from one another and/or in groups, and are discharged, in a controlled manner in each case. The multiple-track conveying device additionally comprises arrangements for controlling the conveying devices in the tracks, such that the product streams on the tracks are synchronized with one another in such a way that a product on a track, following the separation from the respective product stream, is substantially aligned with the products on individual selected other tracks or all of the other tracks, such that the products on the tracks in question are arranged side by side substantially in a row in a direction perpendicular or at an incline to the conveying direction of the products.

16 Claims, 4 Drawing Sheets

(51) Int. Cl.
*B65B 23/14* (2006.01)
*B65G 47/08* (2006.01)
*B65G 47/29* (2006.01)
*B65G 47/84* (2006.01)
*B65B 35/20* (2006.01)

(52) U.S. Cl.
CPC .......... *B65G 47/084* (2013.01); *B65G 47/088* (2013.01); *B65G 47/29* (2013.01); *B65G 47/841* (2013.01); *B65G 47/845* (2013.01); *B65G 47/846* (2013.01); *B65G 2201/0205* (2013.01)

(56) References Cited

U.S. PATENT DOCUMENTS

| | | | |
|---|---|---|---|
| 5,020,655 A | 6/1991 | Cruver | |
| 5,547,004 A * | 8/1996 | Fransen | B65G 47/31 198/419.3 |
| 5,667,055 A * | 9/1997 | Gambetti | B65B 21/06 198/418.7 |
| 5,893,701 A * | 4/1999 | Pruett | B65B 23/14 198/419.1 |
| 6,182,814 B1 | 2/2001 | Koehler | |
| 6,321,896 B1 * | 11/2001 | Zuccheri | B65G 47/082 198/419.1 |
| 6,971,839 B2 * | 12/2005 | Cerutti | B65B 23/14 198/418.6 |
| 7,055,671 B2 * | 6/2006 | De Guglielmo | B65G 29/00 198/419.2 |
| 7,066,317 B2 * | 6/2006 | Iwasa | B65B 5/061 198/419.3 |
| 7,481,309 B2 * | 1/2009 | Wagner | B65G 17/26 198/418.1 |
| 7,815,034 B2 * | 10/2010 | Fleck | B65B 35/405 198/418.7 |
| 7,921,983 B2 * | 4/2011 | Gimmerstam | B65B 35/44 198/418.7 |
| 8,235,200 B2 * | 8/2012 | Fischbacher | B65B 21/06 198/419.1 |
| 8,286,781 B2 * | 10/2012 | Kamps | B65B 21/06 198/419.2 |
| 8,584,828 B2 * | 11/2013 | Pundsack | B65G 17/26 198/426 |
| 8,746,436 B2 * | 6/2014 | Yohe | B65G 47/53 198/428 |
| 2005/0230221 A1 | 10/2005 | Guglielmo | |
| 2008/0099307 A1 | 5/2008 | Fleck | |
| 2011/0168525 A1 | 7/2011 | Vasse et al. | |
| 2013/0239525 A1 | 9/2013 | Hammacher | |

FOREIGN PATENT DOCUMENTS

| | | |
|---|---|---|
| EP | 0644119 | 3/1995 |
| EP | 1300351 | 4/2003 |
| EP | 1514815 | 3/2005 |
| EP | 2381858 | 8/2011 |
| GB | 1396763 | 6/1975 |
| WO | WO 2006/024460 | 3/2006 |
| WO | WO 2010/037959 | 4/2010 |

* cited by examiner

DEVICE AND METHOD FOR CONVEYING LUMPY PRODUCTS

This patent application is a national phase entry of PCT Application No. PCT/EP2012/056702, filed Apr. 12, 2012, which is incorporated in its entirety here by this reference.

The invention relates to a device and a method for conveying lumpy products in such a way that the products are separated from a product stream and are subsequently conveyed further spaced apart uniformly and/or in groups. The invention additionally relates to a device and a method for conveying lumpy products on a plurality of tracks arranged side by side and substantially parallel to one another, wherein the products are separated from a product stream on each of the tracks and are subsequently conveyed further spaced apart uniformly and/or in groups.

The invention relates to a device and a method for conveying lumpy products, wherein this device and this method can be used for example in conjunction with a packing machine, by means of which the lumpy products are packed. By way of example, the products to be conveyed may be sensitive products of the confectionery or long-life baked products industry, such as biscuits, chocolate products and the like. Besides products of the food industry, however, technical products for example are also conceivable, such as electronic or electrotechnical components, machine elements, pharmaceutical or medicinal products, and the like, which are generally produced and distributed in large numbers.

Products of this type, following production thereof, are usually supplied in a more or less unordered and irregular manner in a product stream, in which a large number of identical products are accumulated in a manner contacting one another, to a packing machine or another machine, by means of which the products are conveyed further and processed further. In particular with packing machines, it may be necessary here for the individual products to be supplied in a regular and ordered manner, preferably also at regular, identical distances from one another, to a packing station or another further processing station. Here, it is thus necessary to separate the individual products from the supplied product stream and product accumulation, that is to say to separate the products from the product stream and to then convey further the products individually, preferably at constant, identical distances relative to one another, and to supply the products to the next processing station. Here, it may also be desirable for the individual products to be conveyed further and supplied to the next processing or packing station in regular product groups.

By way of example, a method and a device for filling a multi-row packing tray with lumpy products, in particular what is known as a tray-loading packing machine, are known from DE 10 2010 041 346 A1. With this known packing machine, the lumpy products are conveyed on a plurality of tracks arranged substantially parallel to one another, wherein the individual streams of the products on the plurality of tracks are synchronized with one another such that a product from one track can be transferred substantially simultaneously with a product from the other tracks to a multi-row packing tray. In particular, conveying arrangements for separating an initially gap-free product stream on each of the parallel tracks are provided for this purpose, in such a way that successive individual products from the product stream are conveyed further at a distance from one another. The speed of this further conveyance of the individual products on the plurality of parallel tracks is controlled here such that the products on all tracks, at the end of the tracks, have positions such that each product from each track is transferred substantially simultaneously with the products from the other tracks to the packing tray. This synchronization is implemented here by a plurality of individual conveying arrangements, in particular individual conveyor belts, which are arranged in succession in the conveying direction of the product stream and are formed such that they each convey only an individual product, wherein sensor arrangements are arranged between the individual conveying arrangements in the conveying direction of the product stream and each determine the position of the individual product on each individual conveying arrangement in the conveying direction. Here, the sensor arrangements work together with control arrangements, which control the speed of the individual conveying arrangements depending on the determined position of the product on each individual conveying arrangement (what are known as "smart belts"). In this way, product groups can be formed that for example in each case consist of a row of individual products arranged side by side, that is to say consist of a single-line row of products that are aligned exactly with one another transversely to the conveying direction. At the end of the conveyor section, this single-row product group is transferred to the packing tray, wherein the plurality of individual products arranged side by side are transferred simultaneously into the plurality of compartments, arranged side by side, of the packing tray. The next single-row product group is then supplied at a distance from the previous product group and is transferred to the next row of the receiving compartments of the packing tray.

With this known method, the individual products or rows of a plurality of individual products arranged side by side are supplied in a precisely timed and positioned manner to the receiving arrangement downstream of the conveyor belts by means of the plurality of speed-controlled conveyor belts arranged in succession and side by side, that is to say, in the above-described case, to a container in which the individual products are received in an ordered and in particular stacked manner. Accordingly, the products may also be supplied to other, comparable stacking devices or mechanisms.

This known conveying system, however, is structurally complex due to the large number of individual conveyor belts required, and requires a high outlay in respect of the control and regulation of the conveyor belts in order to attain the above-described synchronization. Due to the large number of required individual conveyor belts, this system is also associated with a high spatial requirement. All of the previously mentioned factors ultimately contribute to the fact that this known system is very cost-intensive.

In order to separate individual products from a continuous product stream or product accumulation, wheel-like or roller-like conveying arrangements are additionally known in the prior art, at the periphery of which drivers are fitted. With a rotation of this conveying wheel, each of the drivers grasps the respective individual foremost product in the product accumulation in the conveying direction (or simultaneously a plurality of foremost products arranged side by side) and separates this product from the accumulation by accelerating said product. With known rotary conveying arrangements of this type, the drivers are typically fitted in a stationary manner and are oriented radially with respect to the center of the axis of rotation of the conveying wheel. Here, the drivers are formed resiliently in part, such that they easily yield when they contact the product in question for further conveyance. As a result, the products should not be damaged or in any case should be damaged to a lesser extent when grasped by the driver in question. In particular in the case of sensitive products of the foodstuffs industry, such as biscuits or other baked products, damage to the products caused by rigid drivers constitutes a large problem. However, even with spring-mounted drivers, product damage is still frequently recorded.

In order to align in rows the individual products conveyed on a plurality of conveying tracks arranged side by side, it is additionally known in the prior art to arrange alignment rails on the conveyor belts. In this case, a bar for example is pivoted into the conveying track and strikes against the conveyed products and aligns said products. However, only an alignment of complete product rows is generally possible here.

Proceeding from these known devices and methods, the object of the invention is to overcome the above-described disadvantages of the prior art and thus create an improved device and an improved method, by means of which lumpy products can be separated from a product stream or product accumulation and subsequently conveyed further at identical or regular distances from one another and/or optionally in groups of products. If product groups are to be formed, a further object lies in arranging the individual products within the product group at identical or regular distances from one another in the conveying direction, wherein the individual groups as a whole are also to be arranged at identical or regular distances from one another in the conveying direction. Here, the distances between the individual groups in the conveying direction may be larger or smaller than the distances in the conveying direction between the individual products within a group. If the products are conveyed on a plurality of tracks arranged side by side and substantially parallel to one another, the individual products arranged side by side on the tracks are to be aligned with one another such that uniform product rows and where applicable corresponding product groups or product patterns are formed. In this way, it is to be made possible to supply the individual products or product rows or product groups arranged in succession in the conveying section to a subsequent receiving or further processing arrangement in a controlled and accurately positioned and timed manner. Here, all previously mentioned method steps are to be implemented such that the products are treated gently and in particular are not damaged. In addition, as a result of the invention, a device and a method for carrying out the aforementioned steps are to be created, said device and said method requiring a lower control and regulation outlay than the systems known in the prior art. The device is also to be compact on the whole and is to have a lower spatial requirement than the known devices. Lastly, as a result of the invention, a device and a method are thus to be created which can be produced and operated more cost-effectively on the whole.

This object is achieved in accordance with the invention by a device for conveying lumpy products according to patent claim 1 and also by a corresponding method according to patent claim 12. For the case that a plurality of tracks arranged side by side and substantially parallel to one another are provided, on which the products are conveyed, the object is achieved in accordance with the invention by a device according to patent claim 9 and also by a corresponding method according to patent claim 13.

In accordance with the invention, a device and a method are thus created for conveying lumpy products in such a way that the products are separated from a product stream and are subsequently conveyed further spaced apart uniformly and/or in groups. Here, the device according to the invention comprises arrangements for supplying the products as a single-row product stream and also arrangements for discharging the separated products spaced apart from one another in a row, wherein the discharging arrangements are arranged after the supplying arrangements in the conveying direction of the products in such a way that the products are transferred from the supplying arrangements to the discharging arrangements. The device according to the invention additionally comprises arrangements for conveying the products, wherein these conveying arrangements are arranged in the area of the transfer from the supplying arrangements to the discharging arrangements, and wherein the conveying arrangements have driver arrangements, which are mounted so as to be pivotable in a controlled manner in the conveying direction of the products and which intervene between two successive products in the supplied product stream in such a way that, with a further movement of the conveying arrangements, said driver arrangements guide the products during the transfer from the supplying arrangements to the discharging arrangements in such a way that the products are separated from the supplied product stream and are conveyed further at uniform distances from one another and/or in groups, and are discharged, in a controlled manner in each case. The method according to the invention is carried out with use of this device according to the invention and comprises corresponding method steps.

If the lumpy products are conveyed on a plurality of tracks arranged side by side and substantially parallel to one another, a device and a method for conveying the lumpy products are created in accordance with the invention, with which the products are separated from a product stream on each of the tracks and are subsequently conveyed further spaced apart uniformly and/or in groups. Here, the multiple-track device according to the invention has one of the previously described single-track conveying devices in each of the individual tracks. The multiple-track conveying device according to the invention additionally comprises arrangements for controlling the individual conveying devices in the plurality of tracks, such that the individual product streams on the plurality of tracks are synchronized with one another in such a way that a product on a track, following the separation from the respective product stream, is substantially aligned with the respective products on individual selected other tracks or on all of the other tracks, such that the products on the tracks in question are arranged side by side substantially in a row in a direction perpendicular or at an incline to the conveying direction of the products. The multiple-track conveying method according to the invention is carried out with use of the previously described multiple-track conveying device according to the invention and comprises corresponding method steps.

In accordance with the invention, the products are thus not only transferred from a first conveying arrangement (supplying arrangement) to a second conveying arrangement (discharging arrangement), but the products are additionally stopped and in particular guided by a further conveying arrangement in the phase of the transfer from the supplying arrangement to the discharging arrangement. For this purpose, this additional conveying arrangement has movable driver arrangements, which can be actuated such that said driver arrangements intervene between two successive products in the phase of the transfer of the products from the supplying arrangement to the discharging arrangement, and, for a certain period of time, contact the foremost product(s) in the product stream in such a way that said driver arrangements stop and guide the product in question in this phase and in doing so separate said product from the product stream and simultaneously accelerate said product such that the separated products are subsequently arranged on the discharging arrangement at regular, identical distances from one another and are thus conveyed further spaced from one another once the driver arrangements have detached from said products, that is to say once the driver arrangements have released the products. The individual products are thus transferred to the subsequent discharging arrangement in a controlled and accurately positioned and timed manner and are positioned and conveyed further on said discharging arrangement.

If a plurality of tracks are arranged side by side and substantially parallel to one another, the individual products are accordingly transferred from the supplying arrangement to the discharging arrangement in a selective and controlled and accurately positioned and timed manner by the conveying arrangements provided in each conveying track by means of the actuated driver arrangements of said conveying arrangements, wherein the products on each of the tracks are accordingly separated from the supplied product stream, accelerated and conveyed further at predefined, uniform distances from one another on the discharging device, and are discharged, in a controlled manner in each case. The conveying devices of the individual tracks are controlled and synchronized with one another here such that the products are ultimately arranged on the plurality of tracks for example in a straight row or line side by side, that is to say for example on a straight line perpendicularly to the conveying direction. Alternatively, the products on the individual tracks can also be aligned with one another such that they are arranged on a line inclined with respect to the conveying direction, said line deviating from the right-angled arrangement. In further exemplary embodiments, the products arranged side by side can also be arranged on other lines on the tracks arranged side by side, for example curved lines, wavy lines or zig-zag lines. Here, it is essential that the individual products on the plurality of tracks arranged side by side are always arranged in a fixed, uniform, predefined and precisely controlled spatial orientation relative to one another.

With the single-track embodiment of the conveying device according to the invention, the products may thus be conveyed further at identical distances from one another on the discharging arrangement. Alternatively however, product groups can also be formed, wherein each group comprises a plurality of products, which are arranged within the group at identical distances from one another. The individual groups are then typically arranged at different distances from one another in the conveying direction, said distances not corresponding to the distances between the individual products within a group. The distances between the individual groups here are typically greater than the distances between the individual products within a group.

In the case of a plurality of tracks arranged side by side, corresponding groups can be provided on each track or individual tracks or a plurality of selected tracks, wherein these groups are arranged on the tracks again in a controlled manner and in a fixed, preferably regular spatial relation to the respective product groups on the other tracks. Since the positions of the individual products on the plurality of tracks arranged side by side can be accurately selected and actuated with the device according to the invention both over tracks (that is to say in the conveying direction) and over rows (that is to say substantially transversely to the conveying direction over the plurality of tracks arranged side by side), any arrangements, patterns and groupings of products, that is to say what are known as "product carpets" or "product matrixes", can be produced with the device according to the invention and the method according to the invention.

In a particular embodiment of the invention, these "product carpets" can also be versatile in a time-dependent manner, that is to say the product conveyance on the individual tracks can be controlled in such a way that the product arrangements and the orientations of the products relative to one another change over time, preferably again in a regular manner.

On the whole, the arrangement and orientation of the individual products on the individual tracks and the formation of product groups and/or "product carpets" possibly caused thereby is dependent on the provided subsequent further processing of the products and the spatial and temporal sequence thereof. As has been explained in the introduction, this may be, for example, a simultaneous transfer of a plurality of products arranged side by side as a product group or product row to a receiving device, in particular a container or a packaging, in which the products are received, grouped accordingly.

So that the described product groups or product carpets can be formed, the conveying device according to the invention in a preferred embodiment comprises control arrangements, which cooperate with the supplying arrangements, the discharging arrangements and the driver conveying arrangements and control the conveying speeds thereof individually in such a way that the products, following separation thereof from the respective product stream, can be conveyed further spaced apart uniformly and selectively in regular groups, as described above.

If the products on the supplying arrangement are not arranged from the outset in an accumulation in succession or contacting one another or otherwise are not arranged at uniform distances from one another, such that the drivers of the conveying arrangements intervene correctly between two successive products and can grasp these products for the further conveyance, as described above, it is necessary to firstly generate a product accumulation or an arrangement of the individual products on the supplying arrangements at a uniform distance from one another. Otherwise, the driver arrangements would, in some circumstances, incorrectly contact the individual products during the course of movement of said driver arrangements, whereby the products could then potentially be damaged. The control arrangements of the conveying device according to the invention in a preferred embodiment therefore control the conveying speeds of the supplying arrangements and/or of the driver conveying arrangements individually in such a way that the products in the supplied product stream contact one another in an accumulation or are arranged at a uniform distance from one another before the drivers intervene between two successive products. The conveying speeds are thus controlled in such a way that the supplied products are always accurately positioned, such that the drivers grasp the products correctly and can transfer the products to the discharging arrangement without damaging the products.

In a further embodiment of the conveying device according to the invention, the accumulation of the products can also be formed by movable stopper arrangements, which cooperate with the control arrangements in such a way that, as required, said stopper arrangements are moved into the conveying area of the supplying arrangements in order to stop the supplied products, that is to say in order to cause the products to contact one another in an accumulation in the supplied product stream. The stopper arrangements are then moved out again from the conveying area of the supplying arrangements in order to cause the product stream to be conveyed further and to release the product stream for the intervention of the drivers between two successive products.

In a further preferred embodiment of the device according to the invention, the further conveying arrangements arranged in the transfer area of the supplying arrangements and of the discharging arrangements are circulating conveying arrangements, in which a plurality of driver arrangements are arranged at the periphery of said conveying arrangements at regular distances from one another and extend substantially radially outwardly from said periphery, and wherein the driver arrangements are mounted by means of a curved track and levers engaging therewith so as to be pivotable in a controlled manner in the direction of the periphery of the conveying arrangements.

In a preferred embodiment, these circulating driver conveying arrangements are wheel-like or roller-like conveying arrangements, which rotate about an axis that is arranged perpendicularly to the conveying direction of the products and parallel to the conveying plane of the supplying arrangements and of the discharging arrangements. In another preferred embodiment, the circulating driver conveying arrangements are (endless) belt or (endless) chain conveying arrangements, which rotate about at least two axes that are arranged parallel to one another and that are arranged perpendicularly to conveying direction of the products and parallel to the conveying plane of the supplying arrangements and of the discharging arrangements.

In the case of the plurality of product conveying tracks arranged side by side and substantially parallel to one another, the drives of the circulating driver conveying arrangements in each of the tracks are coupled to one another in one embodiment of the conveying device according to the invention, wherein the arrangements for controlling the conveying devices in the plurality of tracks cooperate with the supplying arrangements and the discharging arrangements in each of the tracks and control the conveying speeds thereof individually in such a way that the products in each of the tracks, following separation thereof from the respective product stream, are conveyed further at uniform distances from one another and selectively in regular groups.

Alternatively to these coupled drives, the circulating driver conveying arrangements in each of the tracks may each have a dedicated drive in a further embodiment of the invention, said drive not being coupled to the drives of the other circulating driver conveying arrangements, wherein the arrangements for controlling the conveying devices in the plurality of tracks then cooperate with the supplying arrangements, the discharging arrangements and the circulating driver conveying arrangements in each of the tracks and control the conveying speeds thereof individually in such a way that the products in each of the tracks, following separation thereof from the respective product stream, are again conveyed further at uniform distances from one another and selectively in regular groups.

Further details and advantages of the invention will emerge from the following detailed description of various exemplary embodiments on the basis of the accompanying drawings.

FIG. 3b shows a detail of the conveying device from FIG. 3a.

FIG. 4b shows a detail of the conveying device from FIG. 4a.

Figure 1A:
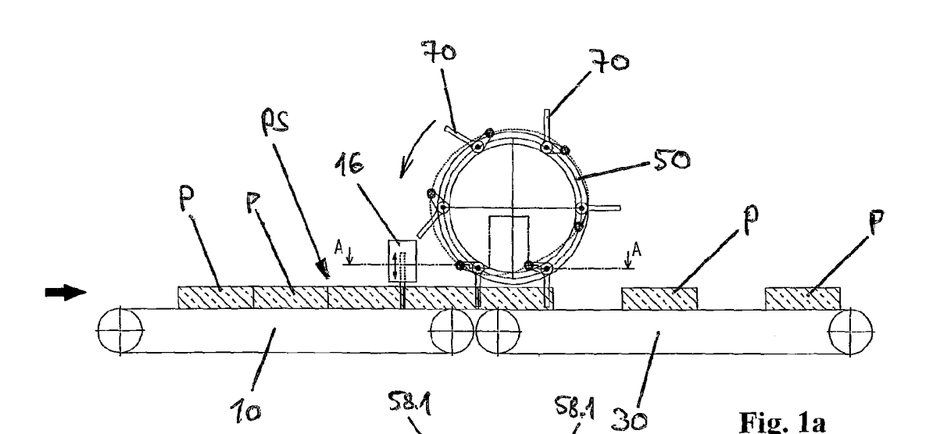
FIG. 1a shows the conveying device according to the invention in a view from the side.
Figure 1B:
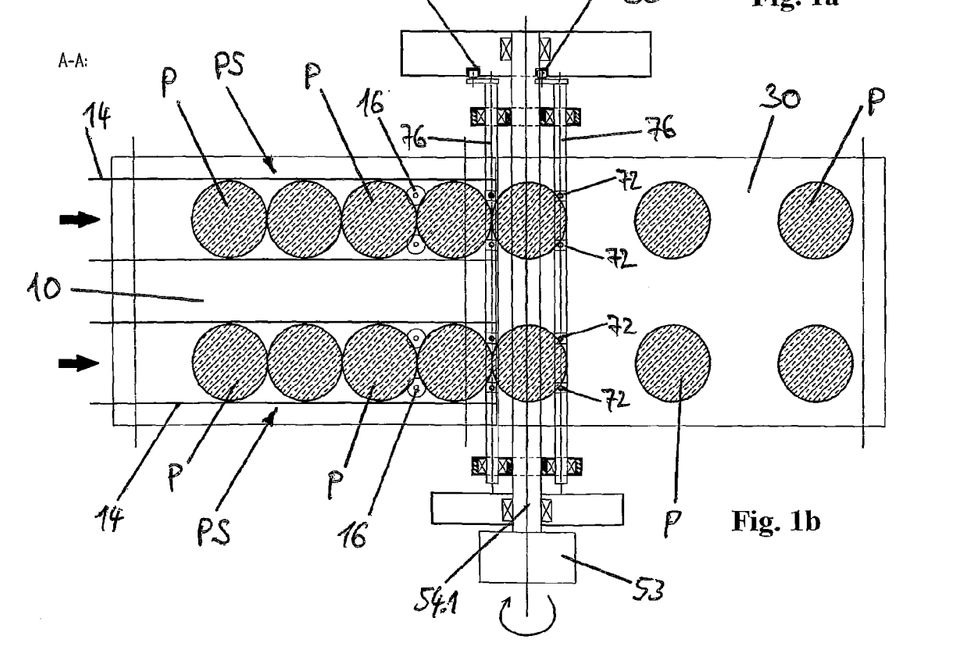
FIG. 1b shows the conveying device according to the invention from FIG. 1a in a sectional view along the line A-A from above.

A conveying device for lumpy products P is illustrated schematically in a side view in FIG. 1a. FIG. 1b shows this conveying device in a plan view from above in the section along the line A-A from FIG. 1a. In FIG. 1b, the products P are conveyed on two parallel tracks arranged side by side.

Figure 2A:
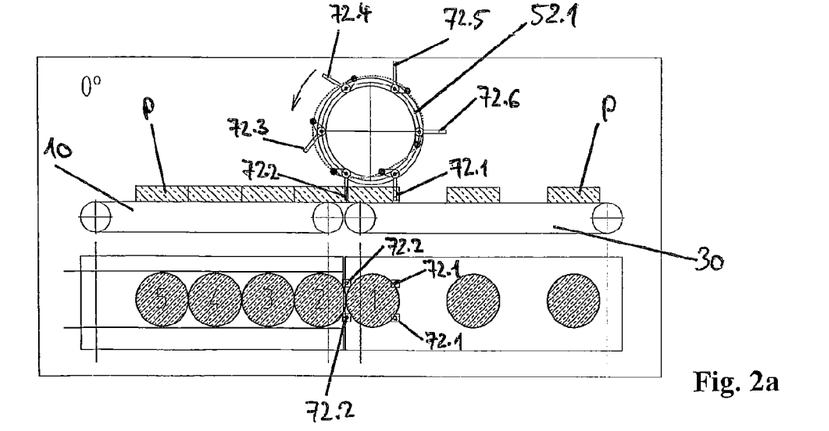
FIGS. 2a to 2c show the conveying device according to the invention in three different positions of angular rotation, in each case in a side view and a view from above corresponding to FIGS. 1a and 1b.
Figure 2B:
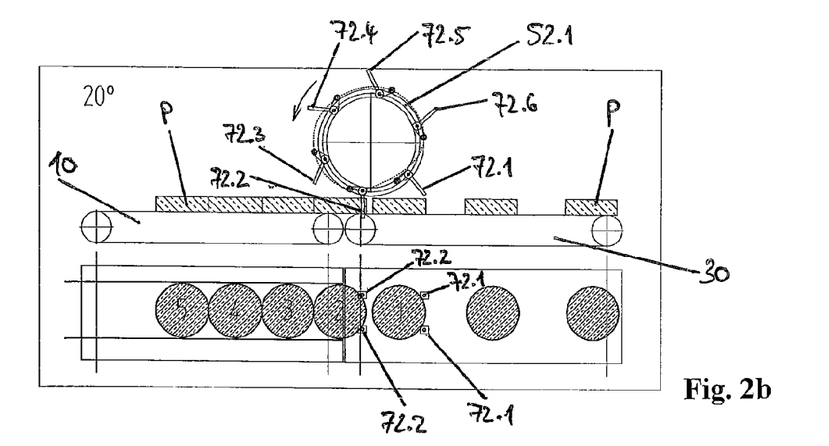
Figure 2C:
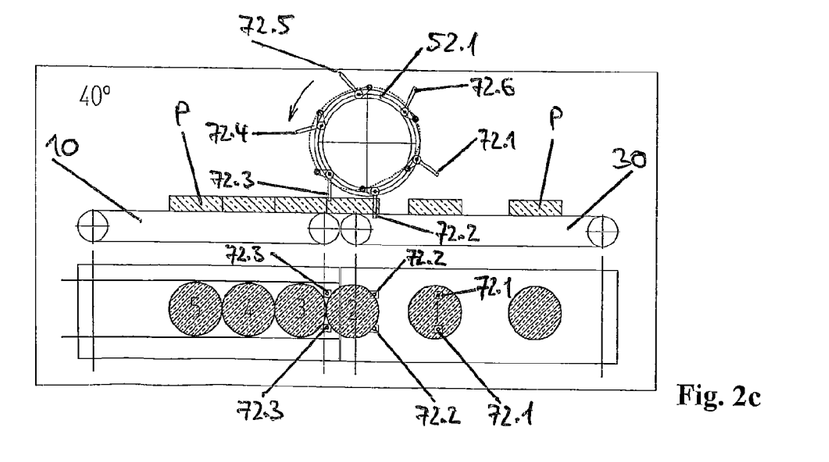

FIGS. 2a to 2c show the conveying device accordingly, in each case in a schematic side view and a schematic plan view from above, wherein FIGS. 2a to 2c illustrate different stages of the product conveyance. The side view in the upper part of FIG. 2a thus corresponds substantially to the side view of FIG. 1a. As can be seen from the respective plan views from above, FIGS. 2a to 2c each show a conveying device consisting of one conveying track. By means of this conveying device, the products P are separated from a product stream or product accumulation PS and are then conveyed further at uniform distances from one another. Here, the primary conveying direction of the products P in the aforementioned figures and also in the further figures discussed hereinafter always runs from left to right.

The individual lumpy products P are supplied to the overall device by means of supplying arrangements 10. Here, the supplying arrangements 10 in particular are circulating band or belt or chain conveying arrangements, for example what is known as an accumulating conveyor. The products P are supplied on these supplying arrangements 10 as a single-row product stream PS, wherein the products P in particular contact one another here in the accumulation. In order to ensure an ordered, regular, linear supply of the products P, lateral guides 14 for the products P can additionally be provided in the area of the supplying arrangements 10.

Discharging arrangements 30 are arranged after the supplying arrangements 10 in the conveying direction and transfer the products P from the supplying arrangements 10 and convey the products further. Here, the discharging arrangements 30 in particular are again circulating band or belt or chain conveying arrangements, for example what is known as an delivery conveyor. As can be seen from the drawings, the supplying arrangements 10 and the discharging arrangements 30 are preferably arranged in succession in such a way that the products P are conveyed substantially without vertical offset in a constant plane and in particular are transferred in one plane from the supplying arrangements 10 to the discharging arrangements 30.

Further conveying arrangements 50 for conveying the products P are arranged above the conveying section formed from the supplying arrangements 10 and the discharging arrangements 30 in the area of the transfer from the supplying arrangements 10 to the discharging arrangements 30. As shown for example in the side views of FIG. 1a and FIGS. 2a to 2c, these conveying arrangements 50 in particular are conveying arrangements circulating over a closed path, in particular wheel-like or roller-like conveying arrangements, that is to say a conveying wheel or a conveying roller 52.1. This conveying wheel or this conveying roller 52.1 rotates on a primary shaft 54.1 about a central axis, which lies perpendicularly to the conveying direction of the products P and parallel to the conveying plane formed by the supplying arrangements 10 and the discharging arrangements 30. The conveying wheel or the conveying roller 52.1 rotates here in an anti-clockwise direction, as is indicated by the arrow in the side views of FIGS. 1a and 2a to 2c. Where reference is made hereinafter to a conveying wheel with respect to the conveying arrangements 50, this is generally always to be understood, depending on the case of application, to also include the embodiment as a conveying roller or comparable other embodiments of circulating conveying arrangements.

The conveying wheel or the conveying roller 52.1 is moved over the primary shaft 54.1 forming the axis of rotation by a drive 53, for example an electric motor and in particular a controllable and regulatable servomotor. The control or regulation of this servo drive is an essential feature of the present conveying device, as will become clear from the following discussion.

In the embodiment shown in FIG. 1b, two parallel single-row product streams PS running side by side are conveyed. The circulating conveying arrangements 50 are therefore formed here as a conveying roller 52.1 or as two conveying wheels 52.1 arranged side by side, such that the products P of the two product streams PS can be conveyed side by side. In the embodiment of FIG. 1b, the conveyor roller 52.1 or the two conveying wheels 52.1 arranged side by side are driven over a common primary shaft 54.1 by means of a common drive 53. The products P of the two rows arranged side by side are thus moved by the conveyor roller 52.1 with the same characteristic, for example the same speed. The conveyor roller 52.1 can thus be formed to a certain extent from two conveying wheels arranged parallel side by side, which are driven via a common axis of rotation 54.1. However, as discussed below in greater detail, the individual conveying wheels 52.1 arranged side by side of the plurality of conveying tracks arranged side by side can also be driven in an isolated manner, separately from one another. In this case, a common drive 53 for all conveying wheels arranged side by side then is not provided, but rather each conveying wheel has a dedicated drive, which in particular can also be controlled individually.

As shown in FIGS. 1a, 1b and 2a to 2c, the conveying arrangements 50 (conveying wheel or conveying roller 52.1) have driver arrangements 70, which are arranged at equal distances from one another on the periphery of the conveying arrangements 50 and extend substantially radially outwardly therefrom. Each of the individual driver arrangements 70 is fitted and mounted on the conveying arrangements 50 such that each driver arrangement 70 is pivotable in the conveying direction of the products P or in the direction of rotation of the conveying arrangements 50. Here, the pivot motion of the driver arrangements 70 can be controlled such that the driver arrangements 70, with a rotation of the conveying arrangements 50, intervene between two products P arranged in succession in the supplied product stream PS in such a way that the driver arrangements 70, with a further rotation of the conveying arrangements 50, hold the products P during the transfer from the supplying arrangements 10 to the discharging arrangements 30 and in particular guide said products in such a way that the products P are separated in a selective and controlled manner from the supplied product stream PS and are arranged at uniform distances from one another on the discharging arrangements 30 and are conveyed further thereby and are discharged.

Figure 3A:
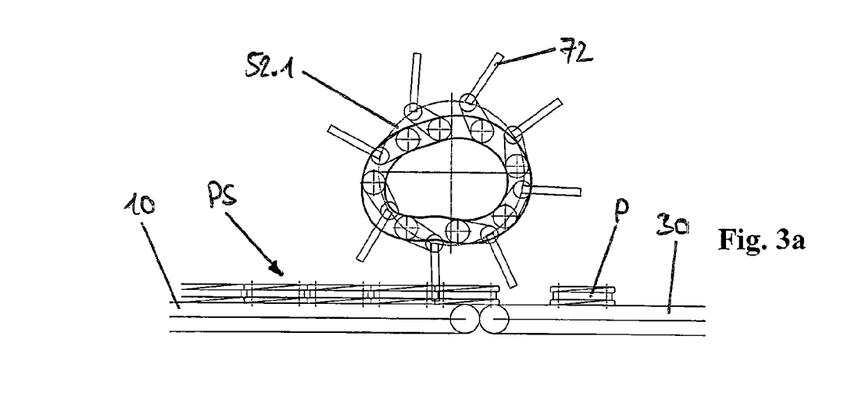
FIG. 3a shows an embodiment of the conveying device according to the invention in a view from the side.
Figure 3B:
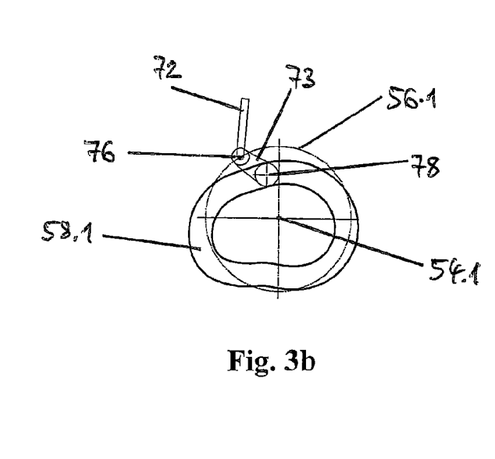

As shown in the side views of FIGS. 1a and 2a to 2c, a plurality of driver arrangements 70, in particular six driver arrangements 70 in the illustrated embodiments, are arranged on the periphery of the conveying wheel 52.1. Here, the driver arrangements 70 point substantially radially outwardly from the periphery of the conveying wheel 52.1, wherein they are not arranged in a stationary manner, however, but, as already mentioned beforehand, are pivotable in the peripheral direction. FIG. 3a shows an embodiment of the conveying wheel 52.1 which is slightly modified compared with the illustration of FIG. 1a. Whereas the conveying wheel 52.1 in FIG. 1a has six driver arrangements 70, the conveying wheel 52.1 of FIG. 3a has eight driver arrangements 70 arranged on the periphery. FIG. 3b shows a detail of the conveying wheel 52.1 from FIG. 3a in order to illustrate and explain the individual parts thereof. Thus, only one of the driver arrangements 70 is illustrated by way of example in FIG. 3b.

Each of the driver arrangements 70 firstly consists of a driver or a driver finger 72, which contacts the products P for conveyance. Each driver arrangement 70 is fitted substantially at the periphery of the conveying wheel 52.1 by means of a bearing 76, and in particular is pivotably mounted. This driver bearing 76 thus forms the axis of rotation or rotational shaft, about which the respective driver arrangement 70 can be pivoted. This driver bearing or driver axis 76 is thus guided over a circular path 56.1 formed with the rotation of the conveying wheel 52.1. For controlled pivoting thereof, each driver arrangement 70 is coupled to a curved track 58.1, which lies substantially beside the respective associated circular path 56.1 of the conveying wheel 52.1, but which has a more or less irregular shape, in particular deviating from an exact circular path (see FIG. 3b). The shape or the course of the curved track 58.1 is defined in particular by the characteristic in accordance with which the driver arrangements 70 have to be pivoted depending on the respective position thereof on the periphery or over the circular path 56.1 of the conveying wheel 52.1 or depending on the rotational position of the conveying wheel 52.1. Due to the curved track 58.1, the pivot motion and in particular the respective angular position of the driver arrangements 70 is thus controlled in accordance with the rotary movement and position of the conveying wheel 52.1.

As shown in particular in FIG. 3b, the driver finger 72 of each driver arrangement 70 is connected via a lever 73 to a driver roll 78, which runs in the curved track 58.1. Due to the movement of the driver roll 78 in the curved track 58.1, the driver finger 72 is pivoted on account of the linkage via the lever 73 in the event of a rotation of the conveying wheel 52.1 about the axis of rotation 76 forming the driver bearing. FIGS. 1a, 2a to 2c and 3a thus show the plurality of driver arrangements 70 at the periphery of the conveying wheel 52.1 in the different pivot positions thereof depending on the position of the driver roll 78, associated with the respective driver finger 72, in the curved track 58.1. Here, the curved track 58.1 is designed such that the pivot motion of the respective driver arrangement 70 can be implemented at different speeds in accordance with the rotational position of the conveying wheel 52.1. In certain portions of the circular path 56.1, only a slow pivot motion or no pivot motion of the driver finger 72 may therefore be implemented for example, whereas in other portions of the rotary movement of the conveying wheel 52.1 along the circular path 56.1 an acceleration or a quicker pivoting of the driver finger 72 is implemented. This movement characteristic is dependent on the respective conditions of the product conveyance, that is to say is therefore structurally dependent inter alia on the dimensions of the lumpy products P to be conveyed, on the conveying speed, the radial length of the driver finger 72, the distance of the arrangement of the conveying wheel 52.1 over or beside the supplying arrangements 10 and the discharging arrangements 30, and on other corresponding parameters. It goes without saying that the pivot motion characteristic of the driver arrangements 70 can be changed in particular by changing the shape of the curved track 58.1.

The curved track 58.1 for guiding the driver arrangements 70 of the circulating conveying arrangements 50 is in particular designed such that a movement characteristic of the driver arrangements 70 is created, with which the driver fingers 72 plunge substantially vertically between the products P arranged at the front in the conveying direction in the accumulation of the product stream PS and grasp the products P in this vertical position, hold said products and guide said products for a specific length of the conveying track. For this purpose, the products P can preferably have a shape that enables such an intervention of the driver fingers 72. By way of example, the products P should thus have a round or substantially round or oval shape or other curved shape, as a result of which a "plunge window" for the drivers 72 in the form of lateral gaps between the successive products P is created between two successive products P contacting one another (see FIG. 1b, for example).

Due to this guidance of the products P by the driver arrangements 70, the products P are separated from the product stream PS supplied via the supplying arrangements (supply or accumulating conveyor) 10 and are accelerated here where necessary, transferred to the subsequent discharging arrangements (delivery conveyor) 30 and are conveyed further thereon at the resultant, uniform distances from one another. The conveying speed of the delivery conveyor 30 may differ here from the conveying speed of the supply conveyor 10; in particular the conveying speed of the delivery conveyor 30 may be greater than the conveying speed of the supply conveyor 10.

The course of movement of the conveying arrangements 50 or of the conveying wheel 52.1 with the driver arrangements 70 or the driver fingers 72 will be described in greater detail hereinafter with reference to FIGS. 2a to 2c. The side view of FIG. 2a corresponds to the illustration of FIG. 1a. FIGS. 2a, 2b and 2c show different rotary angle positions of the conveying wheel 52.1, specifically a first position (FIG. 2a), a position rotated further through 20° in an anti-clockwise direction (FIG. 2b), and a position again rotated further through 20° in an anti-clockwise direction (FIG. 2c). For illustration, the six individual driver fingers 72 of the driver arrangements 70 are denoted as drivers 72.1, 72.2, 72.3, 72.4, 72.5, 72.6 in accordance with the lumpy products "1", "2", "3", etc. associated therewith. With the separation of the products P from the product accumulation PS, each individual product P is held and guided by vertical front and, where appropriate, also rear driver fingers 72. In the starting position of FIG. 2a, the driver fingers 72.1 thus contact the front side of the foremost product "1", whereas the next driver fingers 72.2 intervene between the products "1" and "2" and then grasp the subsequent product "2" at the front side thereof. Here, the drivers 72.2, depending on the case of application, may also grasp the preceding product "1" at the rear side thereof, where appropriate. Both successive drivers 72.1 and 72.2 intervene here in the vertical direction between the two successive products in question, contact the products in this vertical position and move further forward with a further rotation of the conveying wheel 52.1 in the conveying direction, wherein the drivers 72.1 and 72.2 in this phase retain the vertical position thereof for a certain period of time or a certain length of the forward conveyance of the product. This vertical orientation of the drivers 72.1 and 72.2 is controlled by the curved track 58.1 of the conveying wheel 52.1, to which the drivers 72 are coupled, as has been described above.

In the position shown in FIG. 2a, the front side of the foremost product "1" in the product accumulation contacts the driver fingers 72.1 of the conveying wheel 52.1. The subsequent product "2" contacts the product "1". The driver fingers 72.2 intervene in the gap between the products "1" and "2", wherein they do not initially contact any of the products. As can be seen from the illustration of FIG. 2a, the product "1" is indeed already on the delivery conveyor 30. However, said product is still held back by the drivers 72.1, such that it cannot yet move further at the conveying speed of the delivery conveyor 30. In this phase, the product "1" is still moved at the conveying speed of the product accumulation PS, that is to say in particular the conveying speed of the supply conveyor 10. Since the conveying speeds of the supply conveyor and of the delivery conveyor 30 are normally different, wherein the conveying speed of the delivery conveyor 30 in particular may be higher than the conveying speed of the supply conveyor 10, a relative movement takes place in this phase, that is to say a friction between the product "1" and the delivery conveyor 30. Conveying belts with a low coefficient of friction should therefore be used more advantageously.

FIG. 2b shows the conveying wheel 52.1 in a position rotated further through 20°. The driver fingers 72.1 have detached from the foremost product "1" and have thus released said product. The product "1" is thus now moved further by the delivery conveyor 30, and the movement speed of said product is accelerated accordingly. The now foremost product "2" in the product accumulation PS in the meantime contacts the driver fingers 72.2, wherein said product, however, is still held back thereby during the transfer from the supplying conveying 10 to the delivery conveyor 30 and in particular is still held in the product accumulation PS. In particular, the product "2" is held back by the drivers 72.2 or is moved at a slower speed until the distance of said product from the previous product "1" corresponds to the desired distance between the separated products conveyed further on the delivery conveyor 30.

This state is also illustrated in FIG. 2c at a corresponding later moment in time, wherein the conveying wheel 52.1 has already rotated further through a further 20°. In this state, the front side of the product "2" still contacts the driver fingers 72.2, whereas the previous product "1" has already been released and is moved further at the speed of the delivery conveyor 30. At the same time, the next driver fingers 72.3 plunge into the lateral gaps between the products "2" and "3", wherein said driver fingers initially again substantially do not contact any of the products. Only with a further rotation of the conveying wheel 52.1 do the drivers 72.3 then again contact the front side of the product "3" and move again further in the conveying direction, whilst maintaining the vertical orientation thereof, as the conveying wheel 52.1 rotates further.

With this cyclically repeating system, the individual products P are held and guided by the drivers 72 of the driver arrangements 70 during the course of the rotary movement of the conveying arrangements 50 (conveying wheel/conveying roller 52.1) during the transfer from the supplying arrangements (supply conveyor) 10 to the discharging arrangements (delivery conveyor) 30, such that the products P are partitioned and separated individually in a controlled manner from the supplied product stream PS and are subsequently conveyed further at identical distances from one another.

The described controlled pivotable mounting of the driver arrangements 70 of the conveying arrangement 50 has the following further advantages inter alia: due to the vertical plunging (or plunging oriented at an angle and freely selectable within limits) of the drivers 72 into the gaps between the successive products P, the risk of product damage is considerably reduced. In the case that the drivers 72 plunge vertically between the successive products P, the necessary "plunge window" is additionally reduced. This is particularly advantageous with small product diameters, with larger product tolerances and with unfavorable height/diameter ratios of the products.

Due to the pivotable mounting of the driver arrangements 70, the position or orientation of the driver 72 relative to the product can additionally be freely selected in terms of the angle, whereby the characteristic of the delivery of the product to the successive discharging arrangements 30 can be changed. The delivery characteristic of the drivers 72 for example can thus be adjusted such that the products P are released as quickly as possible or the products P are held back as long as possible by the drivers 72. Due to the movement characteristic of the drivers 72, a controlled acceleration of the products during the product release is also possible, whereby the speed difference between the product P and the delivery conveyor 30 at the moment of release of the product is minimized and whereby errors in the positioning of the product P on the delivery conveyor 30 are reduced.

Lastly, due to the pivotable driver arrangements 70, a more accurate positioning and alignment of the products, of the product rows and of the product groups on the delivery conveyor 30 is achieved compared with a conventional transfer of the products from the supply conveyor 10 to the delivery conveyor 30 without additional driver conveying arrangements 50. As has been presented above, this is achieved in that the products, due to the guidance by the driver arrangements 70, are not positioned in an uncontrolled manner on the successive delivery conveyor 30, which generally runs more quickly, and in particular are not accelerated thereby in an uncontrolled manner, but are positioned selectively and in a controlled manner on the delivery conveyor 30. With a plurality of tracks arranged side by side, the products are released by the driver arrangements 70 on the individual tracks, in particular in a synchronous manner and aligned with one another.

The further conveyance of the products P on the discharging arrangements 30 at a regular, constant distance from one another is basically dependent on the cooperation of the supplying arrangements (supply or accumulating conveyor) 10 and of the discharging arrangements (delivery conveyor) 30 with the conveying arrangements 50 (conveying wheel or conveying roller 52.1). In particular, the conveying speeds of these components have to be matched to one another and individually controlled such that on the one hand a product P from the product stream or product accumulation PS is always ready at the correct moment in time, and on the other hand such that the driver arrangements 70 of the conveying arrangements 50 intervene precisely between the waiting products P at this moment in time and in each case grasp the foremost product in the product accumulation PS and release and transfer said product in a controlled manner to the discharging arrangements 30, such that the successive products P on the discharging arrangements 30 are conveyed further at the desired, predefined, regular distance from one another.

In order to achieve this characteristic, control arrangements are provided, which cooperate with the supplying arrangements 10, the discharging arrangements and the conveying arrangements 50 in a suitable manner in order to control the conveying speeds thereof individually, as described. These control arrangements also comprise suitable detector and/or sensor arrangements, which determine the position of the products P in question in the conveying section, wherein the respective conveying speeds of the conveying arrangements in question are then controlled on the basis of this determined information, that is to say are accelerated or slowed or kept constant, such that the products P have the correct placement, position and alignment at any specific relevant moment in time.

In order to ensure that the products P in the area of the conveying arrangements 50 (conveying wheel 52.1) have the correct placement and position for the intervention of the driver arrangements 70, and in order to thus prevent the products P from being damaged by the intervening driver arrangements 70 in the event of an incorrect positioning at a given moment in time, it is in particular necessary for the products P to be supplied continuously and regularly in the conveying direction before the conveying wheel 52.1. In particular, the products P should contact one another in the accumulation in the product stream PS supplied via the supplying arrangements 10 or should be arranged selectively at uniform distances from one another. Should there otherwise be no continuous, regular product supply and no sufficient product accumulation in the area before the conveying wheel 52.1, there is the aforementioned risk, with an irregular or non-continuous product supply, that the products P may be contacted incorrectly by the drivers 72 and therefore in particular may be damaged. In order to achieve this, control arrangements are provided and designed in such a way that the conveying speeds of the supply arrangements (supply conveyor) 10 and/or of the conveying arrangements 50 (conveying wheel 52.1) and/or where appropriate also of the discharging arrangements (delivery conveyor) 30 are individually controlled and matched to one another or synchronized with one another. The control arrangements for the described influencing of the movement characteristics may comprise, inter alia, a speed-variable drive (for example by means of a servomotor) of the primary shaft 54.1 of the conveying wheel 52.1 in question and/or a variable speed of the supplying arrangements (supply conveyor) 10 and/or of the discharging arrangements (delivery conveyor) 30. However, the movement characteristics may additionally also be influenced by the respective design of the curved track 58.1 for the guidance of the drivers 72 of the conveying wheel 52.1 and also by a displacement or change of the curved track 58.1, which is also possible in a controlled manner during operation, that is to say during the rotation of the conveying wheel 52.1.

In order to ensure that the products P contact one another in the accumulation prior to the feeding thereof to the conveying wheel 52.1 and prior to the respective intervention of the drivers 72 between the successive products P in the supplied product stream PS or are arranged at a uniform distance from one another, movable stopper arrangements 16 can be provided in the area of the supply conveyor 10, alternatively or in addition to the previously described control arrangements. Such stopper arrangements 16 are illustrated by way of example in FIGS. 1a and 1b. These stopper arrangements 16 are used and cooperate where appropriate with the aforementioned control arrangements in such a way that the stopper arrangements 16 are moved into the conveying track of the supply conveyor 10 as necessary when an insufficient number of individual products P is provided via the supply conveyor 10. The stopper arrangements 16 then hold back the supplied products P in a defined manner and cause the products P to now contact one another in the accumulation in the supplied product stream PS. In this phase, a friction or relative movement between the products P and the supply conveyor 10 may be provided in some circumstances. The conveying wheel 52.1 runs empty during this period (that is to say without product conveyance) or is stopped.

As soon as a sufficient number of products P are present contacting one another in the accumulation, the stopper arrangements 16 are moved out again from the conveying area of the supply conveyor 10, whereby the product stream PS is released and is conveyed further from the supply conveyor (or accumulating conveyor) 10 toward the conveying wheel 52.1, where the products are then ready for the intervention of the drivers 72 of the conveying wheel 52.1 between two successive products P and are correctly positioned.

In FIGS. 1a and 1b and also 2a to 2c, the conveying arrangements 50 are illustrated as a substantially circular conveying wheel or circular conveying roller 52.1, which rotate about a central axis of rotation 54.1, wherein the axes of rotation 76 of the pivotable bearing of the drivers 72 move around the axis of rotation 54.1 over a circular path 56.1. This embodiment is also illustrated in particular in FIGS. 3a and 3b. Alternatively to this embodiment however, the circulating conveying arrangements 50 can also be formed from a circulating endless belt or a circulating endless chain or the like, which rotate about at least two axes 54.2, 55.2 arranged parallel to one another, that is to say do not circulate over a circular path. These belt or chain conveying arrangements 52.2 are illustrated by way of example in FIGS. 4a and 4b, wherein FIG. 4b, for illustration, shows a detail of the illustration of FIG. 4a. The two axes of rotation 54.2 and 55.2 of the belt or chain conveying arrangements 52.2 are arranged here again perpendicularly to the conveying direction of the products P and parallel to the conveying plane of the supplying arrangements 10 and of the discharging arrangements 30.

Figure 4A:
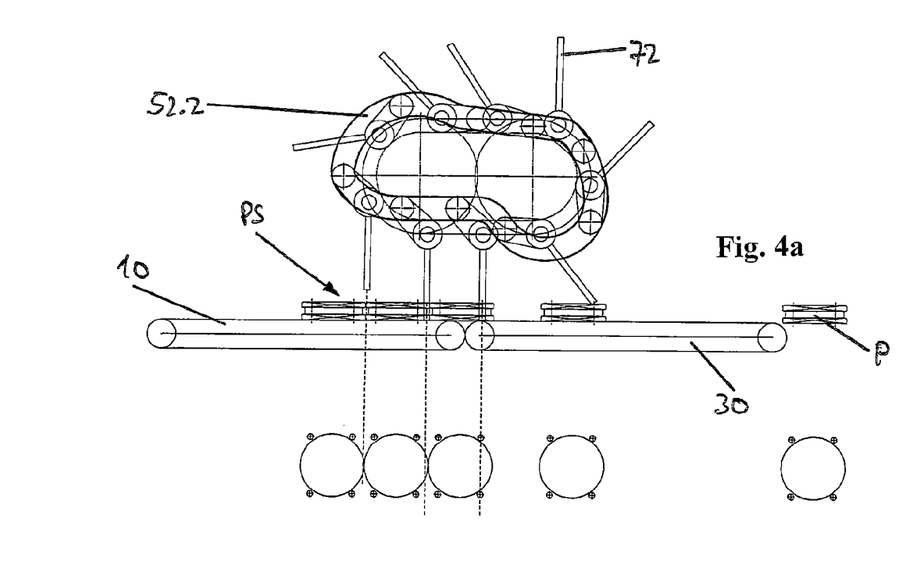
FIG. 4a shows another embodiment of the conveying device according to the invention in a side view and also a schematic partial view from above.
Figure 4B:
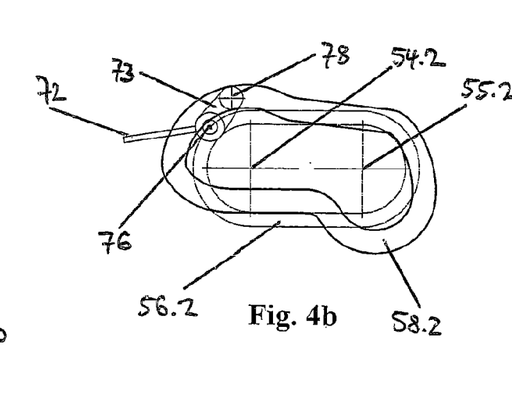

The driver arrangements 70 of the belt or chain conveyors 52.2 of the embodiment shown in FIGS. 4a and 4b correspond substantially to the driver arrangements 70 of the embodiment shown in FIGS. 3a and 3b, that is to say they again consist of a driver finger 72 and a driver shaft or driver axis 76, about which the drivers 72 can be pivoted in the peripheral direction. With the conveying movement of the belt or chain conveyor 52.2, the driver shaft 76 thus runs over a substantially oval-shaped path 56.2 about the two axes of rotation 54.2 and 55.2. The driver finger 72 of the driver arrangement 70 is again connected via a lever 73 to a driver roll 78, which runs and is guided in a curved track 58.2. The curved track 58.2 is arranged substantially beside the oval-shaped guide path 56.2 of the driver bearings 76, wherein the course of the curved track or shape thereof deviates however from a regular oval shape. The curved track 58.2 for guiding the driver rolls 78 is in particular again designed and shaped such that the driver fingers 72, with a rotation of the belt or chain conveyor 52.2, move into the conveying section of the products P on the supply conveyor 10 and the delivery conveyor 30, such that the driver fingers 72 again plunge in a vertical orientation between the successive products P and contact the products P as necessary in order to hold and to guide said products over a certain portion of the conveying section, whereas the driver fingers 72 retain the vertical orientation thereof. As soon as the individual products P have been transferred to the delivery conveyor 30 and have the correct, predefined distance from the respective previous product P, said products are released again by the driver fingers 72 by pivoting the driver fingers 72 out from the vertical position thereof by means of the driver rolls 78 guided in the curved track 58.2 and by means of the linkage via the levers 73, and therefore in particular by moving said driver fingers out from the conveying section as a whole.

With regard to the pivot motion of the driver arrangements 70 in relation to the conveyed products P, that which has been described above with regard to the conveying wheel or the conveying roller 52.1 applies in principle to the belt or chain conveyor 52.2. However, depending on the case of application, the belt or chain conveyor 52.2 may be advantageous compared with the conveying wheel 52.1 insofar as a longer path of travel can be produced on account of the (in principle) oval shape of the conveying motion of the drivers 72, over which path of travel the drivers 72 intervene between the successive products P and hold and guide the products P during the further movement and thus transfer said products selectively and in a controlled manner from the supply conveyor 10 to the delivery conveyor 30 (see FIG. 4a in particular).

The conveying device according to the invention has been described previously substantially on the basis of an individual conveying section or conveying track. However, as has already been indicated above in conjunction with FIG. 1b, it may be desirable, for certain cases of application, to arrange a plurality of such conveying sections or conveying tracks side by side and substantially parallel to one another, wherein each of these plurality of tracks, considered individually, functions in principle as has been described above. The products P on each individual of the plurality of tracks are thus separated from the respective product stream PS and are subsequently arranged and conveyed further at identical and/or regular distances from one another and/or in groups. Here, an essential feature of such a multiple-track arrangement is that the products on the tracks arranged side by side are aligned with one another in a predefined manner so as to form straight rows, for example transversely or at an incline to the product conveying direction, or rows running over a regular curved track of products P arranged side by side accordingly. In this way, any patterns of product groups or "product carpets" or "product matrixes" can be produced, wherein such product patterns or product groups, where desired and necessary, may also have gaps or voids.

In order to form such product patterns or product groups, control arrangements are provided, which control the individual conveying devices in the tracks arranged side by side, such that the individual product streams PS on the plurality of tracks are synchronized with one another in such a way that a product P on a track, following the separation from the respective product stream PS, is substantially aligned with the respective products P on individual selected tracks or all of the further tracks, such that the products P on the tracks in question are arranged, as desired, side by side substantially in a row over a straight or regularly curved line. The control arrangements for the individual conveying devices in the tracks arranged side by side are formed here substantially exactly as has been explained above with reference to the control arrangements of the single-track embodiment, in which the control arrangements cooperate with the supplying arrangements 10, the discharging arrangements 30 and the conveying arrangements 50 and control the conveying speeds thereof individually in such a way that the products P, following separation thereof from the product stream PS, can be conveyed further in a manner uniformly spaced and selectively in regular groups PG.

With the multiple-track embodiment of the conveying device, a distinction is to be made in principle between an embodiment in which the drives of the circulating driver conveying arrangements 50 (for example conveying wheel 52.1 or belt conveyor 52.2) in each of the tracks are coupled to one another and an embodiment in which the circulating driver conveying arrangements 50 in each of the tracks have a dedicated drive, which is not coupled to the drives of the other circulating driver conveying arrangements. In the first-mentioned case of the drives coupled to one another, the previously mentioned control arrangements for controlling the individual conveying devices and for synchronizing the individual product streams in the plurality of tracks arranged side by side have to cooperate with the supplying arrangements 10 and the discharging arrangements 30 in each of the tracks and control the conveying speeds thereof individually in such a way that the products P in each of the plurality of tracks, following separation thereof from the respective product stream PS, are conveyed further at uniform distances from one another and selectively in regular groups.

In the second aforementioned case, in which the circulating driver conveying arrangements in each of the tracks have a dedicated drive, which is not coupled to the drives of the other driver conveying arrangements, the control arrangements for controlling the conveying devices and for synchronizing the individual product streams in the plurality of tracks have to cooperate both with the supplying arrangements 10 and the discharging arrangements 30 and also with the circulating driver conveying arrangements 50 in each of the tracks and have to control the conveying speeds thereof individually in such a way that the products P in each of the tracks, following separation thereof from the respective products stream PS, are again conveyed further at uniform distances from one another and selectively in regular groups PG.

FIGS. 5b to 5e show various embodiments of the conveyance of products P on a plurality of tracks arranged side by side. The principles explained hereinafter on the basis of two tracks arranged side by side also apply accordingly to devices in which more than two tracks are arranged side by side. FIG. 5a, for comparison, initially again shows a single-track embodiment, to which the comments made above in conjunction with FIGS. 1 to 4 apply accordingly. In the illustrations of FIGS. 5a to 5e, the essential components are illustrated schematically, that is to say, inter alia, the driver conveying arrangements 50 (conveying wheel or conveying roller or belt conveyor or chain conveyor) and also the drivers 72 contacting the foremost product P in the supplied product stream PS. In the area of the supplying arrangements 10, a detector or sensor arrangement 12 (for example in the form of a camera) is illustrated before the driver conveying arrangements 50 in the conveying direction and is used to determine whether or not a product P is present before the driver conveying arrangements 50 in the supplied product stream PS, that is to say whether a sufficient product accumulation is present. The information thus determined is supplied to the control arrangements, which control the movement speeds of the individual conveyors, as has been explained above. As can also be seen lastly from FIG. 5a, the products P separated from the product stream PS by means of the driver conveying arrangements 50 are then conveyed further at identical distances T1 from one another on the discharging arrangements 30.

Figures 5A, 5B:
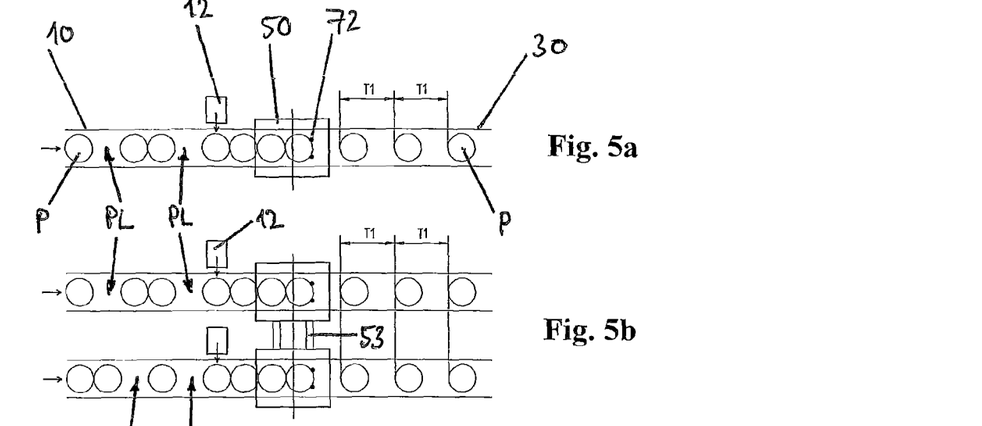
FIG. 5a schematically shows an embodiment of a single-track conveying device according to the invention.
FIGS. 5b to 5e show various embodiments of a two-track conveying device according to the invention.

FIG. 5b shows a two-track arrangement, wherein each of the tracks, considered individually, corresponds to the track shown in FIG. 5a. The products P on both tracks are supplied here with gaps on the respective supply conveyors 10 (product gaps or product voids PL), that is to say the products are not arranged entirely contacting one another in the accumulation before the conveying arrangements 50. This situation is detected by the detector arrangements 12, such that the control arrangements control the conveying speeds of the conveying arrangements in question, such that a complete product accumulation is first produced. For this purpose, the conveying arrangement (conveying wheel) 50 for example can be stopped, such that the foremost drivers 72 in the conveying direction stop the products supplied via the supply conveyor 10, whereby the products in the supplied product stream PS fill up to form a gap-free product accumulation. The drives of the two conveying arrangements 50 on the individual tracks are coupled to one another in the embodiment of FIG. 5b, that is to say the conveying wheels of the individual tracks have a fixed, common drive, such that they run at the same speed and have the same movement characteristics (for example acceleration, standstill, etc.).

Figure 5C:
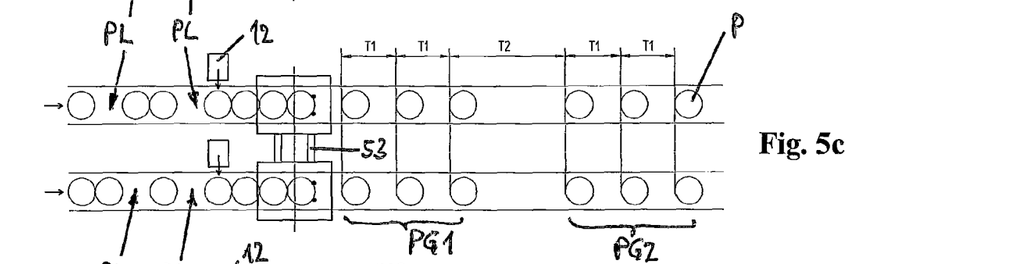

FIG. 5c corresponds to FIG. 5b, wherein, in the embodiment of FIG. 5c however, not all products P separated from the product stream are conveyed further on the discharging arrangement 30 with the equal distance T1. Rather, product groups PG1, PG2 are formed here, wherein the products within a group and preferably in each of the groups PG1 and PG2 have equal distances T1 from one another in the conveying direction, whereas the individual groups PG1, PG2 have a different distance from one another in the conveying direction, in FIG. 5c in particular a distance T2, which is greater than the distance T1 between the individual products within the groups PG1, PG2. The different distances T1, T2 and therefore the product groups PG1, PG2 are produced by means of the above-described control arrangements and by means of different conveying speeds, produced by said control arrangements, of the individual conveying arrangements (in particular conveying wheel 52.1 and/or delivery conveyor 30).

Figures 5D, 5E:
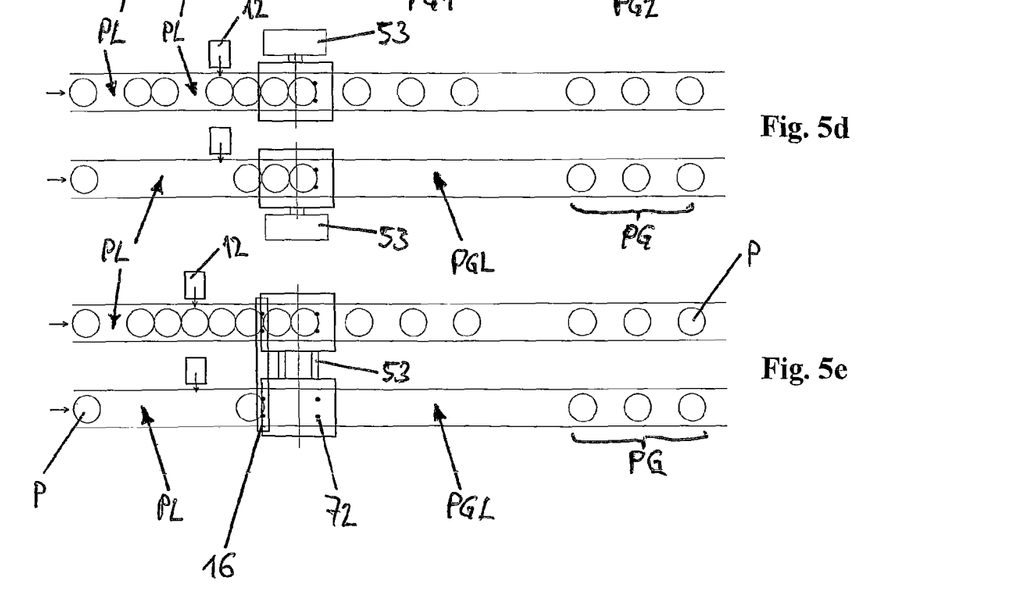

FIG. 5d shows an embodiment similar to FIG. 5c for forming individual product groups PG on the discharging arrangements (delivery conveyor) 30. However, by contrast with the embodiment of FIG. 5c, in the embodiment of FIG. 5d the drives of the conveying arrangements 50 (for example conveying wheel 52.1) now are not coupled to one another, that is to say the conveying arrangements 50 each have a dedicated drive 53. As has already been explained in the introduction, the drives 53 can be formed in particular by servomotors, which can be controlled in a versatile manner and individually.

In the embodiment of FIG. 5d, the product stream supplied on the supply conveyor 10 is initially again incomplete, that is to say the products are not arranged contacting one another in a complete accumulation before the conveying arrangements 50. The necessary product accumulation can again be formed, for example by temporarily running the conveying arrangements 50 with the drivers 72 more slowly or by stopping said conveying arrangements, or by temporarily accelerating the supply conveyor 10 and running said conveyor more quickly so that more products per unit of time are supplied into the area before the conveying arrangements 50 so that the products P are then ultimately again arranged in contact with one another in the accumulation in the area of the conveying arrangements 50 for the intervention of the drivers 72. Due to the separate drives 53 of the individual conveying arrangements 50 in each of the tracks, each track is controlled individually in order to form the product accumulation.

As also shown in FIG. 5d, uniform product groups PG are formed on the delivery conveyors 30. Here, however, individual product groups may be missing on some of the individual tracks, that is to say gaps PGL in the size of individual product groups PG are produced on the delivery conveyors 30 (see FIG. 5d, lower conveying track). For targeted formation of these product group gaps PGL, the individual products P are again stopped in the area of the conveying arrangements 50 by the drivers 72, and/or the delivery conveyor 30 in question, on which the product group gap PGL is to be formed, runs at a higher speed for a certain portion of time. In principle, the formation of the product groups and of the distances between the individual product groups and of the distances between the individual products within the product groups and also the formation of any product group gaps are always dependent on the cooperation of the respective conveying speeds of the three essential conveying components, specifically the supplying arrangements (supply conveyor) 10, the discharging arrangements (delivery conveyor) 30 and the driver conveying arrangements (conveying wheel or belt conveyor) 50.

Lastly, FIG. 5e shows yet a further embodiment similar to the embodiment of FIG. 5d. Here, on the one hand the supply conveyor 10 again is not completely filled with products, such that the products before the conveying wheel 50 initially are not arranged in contact with one another in the accumulation. In addition, a product group gap PGL is again formed on the delivery conveyor 30 of the lower conveying track in FIG. 5e, wherein the product groups PG apart from that, however, are each formed completely. By contrast with the embodiment of FIG. 5d, but in accordance with the embodiments of FIGS. 5b and 5c, in the embodiment of FIG. 5e the drives of the conveying arrangements (conveying wheels) 50 in the individual tracks are again coupled to one another or the individual conveying arrangements 50 in the tracks are moved via a common drive. By contrast with the previously described embodiments, the accumulation formation of the products in the area before the conveying arrangements 50 is produced here by stopper arrangements 16, for example a stopper strip, which, as has been described above, is moved into the conveying track for product accumulation formation in order to stop the supplied products before the conveying arrangements 50. If sufficient individual products P have built up to form a product accumulation PS and for example the detector arrangements 12 in the supply area no longer determine product gaps PL, the stopper arrangements (stopper strip) 16 are moved out again from the conveying area, whereby the product stream PS is released for supply to the conveying arrangements 50 and an intervention of the drivers 72 thereof between the individual products P is released.

An embodiment with stopper arrangements corresponding to FIG. 5e is a cost-effective alternative to the product accumulation formation by means of individual control of the conveying components in question, as has been described above in conjunction with FIGS. 5b to 5d. The embodiment with the stopper arrangements is thus recommended in particular in the case of conveying devices with which there is an increased risk that individual tracks in the area of the product supply are underfilled temporarily, that is to say in these areas there is no product accumulation or insufficient product accumulation temporarily.

As is clear from FIGS. 5b to 5e, multiple-track conveying devices can be produced, of which the conveying arrangements (conveying wheels) are coupled via a common drive, or of which the conveying arrangements have drives that are separate from one another. The illustrated embodiments are suitable in particular for such cases of application in which, for example, there is the risk that individual tracks in the area of the product supply are not sufficiently filled with products, such that the products are not supplied in the product accumulation to the driver conveying arrangements, or for cases in which the output of the products onto the discharging arrangements in order to form identical distances and/or regular product groups is to be controlled. As has been presented above, the conveying speeds of the individual tracks and/or of the respective conveying elements are to be controlled and matched to one another for this purpose, and, in extreme cases, brought to zero, wherein the individual products can be output in a manner offset over time and with respect to the position of said products.

In addition, it is conceivable to create multiple-track conveying devices in which the conveying arrangements (conveying wheels or belt conveyors) 50 are not arranged side by side, but are offset in relation to one another in the conveying direction. Here, the drives of the conveying arrangements can again be coupled to one another or decoupled from one another selectively as individual drives for each conveying arrangement in each of the plurality of tracks. If, in this case, the conveying arrangements 50 are offset in relation to one another for example such that, in alternation, a conveying arrangement in one track is arranged further forward in the conveying direction and the next conveying arrangement arranged therebeside in the next track is arranged further to the rear in the conveying direction, all front conveying arrangements (conveying wheels) can be moved over a primary shaft with a common drive, whereas all rear conveying arrangements can accordingly be moved over a second primary shaft with a second common drive.

With the above-described embodiments of the overall conveying device, almost any product groups or "product carpets" or "product matrixes" can thus be produced, since the respective position of an individual product can be accurately selected and actuated both over tracks and over rows (that is to say transversely to the tracks), and the individual products can therefore be exactly aligned with one another in accordance with the pattern to be produced. The alignment of the products with one another and therefore the product group formation can also be versatile in a time-dependent manner, that is to say can be variable over time.

LIST OF REFERENCE SIGNS

P lumpy product
PS product stream, product accumulation
PG product group
PL product gap, product void
PGL product group gap
T1 distance between two products
T2 distance between two product groups
10 supplying arrangements, supply conveyor, accumulating conveyor
12 detector, sensor
14 lateral guide
16 stopper arrangement
30 discharging arrangements, delivery conveyor
50 (driver) conveying arrangements
52.1 wheel conveying arrangements, roller conveying arrangements, conveying wheel, conveying roller
53 drive, servomotor
54.1 axis of rotation, primary shaft
56.1 circular path for driver bearing
58.1 curved track for driver guidance
52.2 belt conveying arrangements, chain conveying arrangements, belt conveyor, chain conveyor
54.2 first axis of rotation
55.2 second axis of rotation
56.2 oval path for driver bearing
58.2 curved track for driver guide
70 driver arrangements
72 driver, driver finger
72.1-72.6 driver, driver finger
73 lever
76 driver bearing, drive shaft, driver axis of rotation
78 driver roll for curved track

The invention claimed is:

1. A device for conveying lumpy products in such a way that the products are separated from a product stream and are subsequently conveyed further spaced apart from each other uniformly in at least one group, the device comprising:
supplying arrangements for supplying the products as a single-row product stream;
discharging arrangements for discharging the products spaced apart from one another in a row, wherein the discharging arrangements are arranged after the supplying arrangements in a conveying direction of the products in such a way that the products are transferred from the arrangements to the discharging arrangements; and conveying arrangements for conveying the products, wherein the conveying arrangements are arranged in a transfer area from the supplying arrangements to the discharging arrangements, and wherein the conveying arrangements have driver arrangements, which are mounted so as to be pivotable in a controlled manner in the conveying direction of the products and which form an intervention between at least two successive products in the product stream in such a way that, with a further movement of the conveying arrangements, said driver arrangements guide the products during the transfer from the supplying arrangements to the discharging arrangements in such a way that the products are separated from the product stream and are conveyed further at uniform distances from one another in at least one group, and are discharged, in a controlled manner in each case;

control arrangements, which cooperate with the supplying arrangements, the discharging arrangements and the conveying arrangements and control conveying speeds of the supplying arrangements, the discharging arrangements and the conveying arrangements individually in such a way that the products, following separation thereof from the product stream, are conveyed further spaced art uniformly in the at least one group; and movable stopper arrangements for the products, wherein the stopper arrangements cooperate with the control arrangements in such a way that the stopper arrangements are moved into a conveying area of the supplying arrangements in order to cause the products in the product stream to contact one another in an accumulation and in such a way that the stopper arrangements are subsequently moved out from the conveying area of the supplying arrangements in order to cause the product stream to be conveyed further and to be released for the intervention of the driver arrangements between at least two successive products in the product stream.

2. The device as claimed in claim 1, wherein the conveying arrangements are circulating conveying arrangements, wherein the driver arrangements are arranged at regular distances from one another on a periphery of the circulating conveying arrangements and extend substantially outwardly therefrom, and wherein the driver arrangements are mounted by means of a curved track and levers engaging therewith so as to be pivotable in a controlled manner in a direction of the periphery of the circulating conveying arrangements.

3. The device as claimed in claim 2, wherein the circulating conveying arrangements are wheel-like conveying arrangements, which rotate about an axis, which is arranged perpendicularly to the conveying direction of the products and parallel to a conveying plane of the supplying arrangements and of the discharging arrangements.

4. The device as claimed in claim 2, wherein the circulating conveying arrangements are belt conveying arrangements, which rotate about at least two axes arranged parallel to one another, which are arranged perpendicularly to the conveying direction of the products and parallel to a conveying plane of the supplying arrangements and of the discharging arrangements.

5. The device as claimed in claim 2, wherein the circulating conveying arrangements are roller-like conveying arrangements, which rotate about an axis, which is arranged perpendicularly to the conveying direction of the products and parallel to a conveying plane of the supplying arrangements and of the discharging arrangements.

6. The device as claimed in claim 2, wherein the circulating conveying arrangements are chain conveying arrangements, which rotate about at least two axes arranged parallel to one another, which are arranged perpendicularly to the conveying direction of the products and parallel to a conveying plane of the supplying arrangements and of the discharging arrangements.

7. The device as claimed in claim 1, wherein the supplying arrangements and the discharging arrangements are arranged in succession in such a way that the products are transferred substantially in one plane from the supplying arrangements to the discharging arrangements wherein the discharging arrangements and the supplying arrangements each comprises a mechanism selected from the group consisting of a circulating band, a circulating belt, and a circulating chain conveying arrangement.

8. The device as claimed in claim 1 wherein the device is configured to convey products from a plurality of product streams arranged side by side and substantially parallel to one another, wherein the products are separated from their respective product stream and are subsequently conveyed further spaced apart uniformly in the at least one group; the device further comprising:

control arrangements for controlling the conveying arrangements, the supplying arrangements, and the discharging arrangements such that the plurality of product streams are synchronized with one another in such a way that, following the intervention between at least two products in the plurality of product streams, the products in a first product stream are substantially aligned with the products in a second product stream, such that the products in the first product stream and the products in the second product stream are arranged side by side substantially in a row in a direction perpendicular to the conveying direction of the products.

9. The device as claimed in claim 8, wherein drives of the conveying arrangements for the products in each of the product streams are coupled to one another, and wherein the control arrangements cooperate with the supplying arrangements and the discharging arrangements and control the conveying speeds thereof individually in such a way that the products in each of the product streams, following separation thereof from the respective product stream, are conveyed further at uniform distances from one another in the at least one group.

10. A method for conveying lumpy products carried out with use of the device as claimed in claim 8 wherein the plurality of product streams are arranged side by side and substantially parallel to one another, wherein following intervention between at least two products in the respective product stream, the products are subsequently conveyed further spaced apart uniformly in the at least one group.

11. The method as claimed in claim 10, wherein the products, following the separation from the product streams, are conveyed further in groups, wherein each group comprises a plurality of products arranged on at least one track wherein each product is spaced apart by a same distance in the conveying direction and wherein some of the products are arranged side by side substantially in a row in a perpendicular direction to the conveying direction on the at least one track, and wherein a first group is arranged at identical distances from a second group in the conveying direction, wherein the distances between the individual groups differ from the distances between the individual products within a group.

12. A method for conveying lumpy products carried out with use of the device as claimed in claim 1 wherein following intervention between at least two products in the product stream, the products are subsequently conveyed further spaced apart uniformly in the at least one group.

13. The device as claimed in claim 1 further comprising a plurality of tracks arranged side by side and substantially parallel to one another, wherein the products are separated from the product stream on each of the tracks and are subsequently conveyed further spaced apart uniformly in the at least one group; and     control arrangements for controlling at least the conveying arrangements on the plurality of tracks such that the product streams on the plurality of tracks are synchronized with one another in such a way that, following the intervention between at least two products in the product streams, the products on a first track from the respective product stream are substantially aligned with the products on a second track, such that the products are arranged side by side substantially in a row at an incline to the conveying direction of the products.

14. The device as claimed in claim 1, wherein the control arrangements control the conveying speeds in such a way that the products in the product stream are arranged at a uniform distance from one another before the driver arrangements of the conveying arrangements form an intervention between two successive products in the product stream.

15. A device for conveying lumpy products in such a way that the products are separated from a product stream and are subsequently conveyed further spaced apart from each other uniformly in at least one group, the device comprising:

supplying arrangements for supplying the products as a single-row product stream;

discharging arrangements for discharging the products spaced apart from one another in a row, wherein the discharging arrangements are arranged after the supplying arrangements in a conveying direction of the products in such a way that the products are transferred from the supplying arrangements to the discharging arrangements; and     conveying arrangements for conveying the products, wherein the conveying arrangements are arranged in a transfer area from the supplying arrangements to the discharging arrangements, and wherein the conveying arrangements have driver arrangements, which are mounted so as to be pivotable in a controlled manner in the conveying direction of the products and which form an intervention between at least two successive products in the product stream in such a way that, with a further movement of the conveying arrangements, said driver arrangements guide the products during the transfer from the supplying arrangements to the discharging arrangements in such a way that the products are separated from the product stream and are conveyed further at uniform distances from one another in at least one group and are discharged, in a controlled manner in each case;

control arrangements, which cooperate with the supplying arrangements, the discharging arrangements and the conveying arrangements and control conveying speeds of the supplying arrangements, the discharging arrangements and the conveying arrangements individually in such a way that the products, following separation thereof from the product stream, are conveyed further spaced apart uniformly in the at least one group; wherein the control arrangements control the conveying speeds in such a way that the products in the product stream contact one another in an accumulation before the driver arrangements of the conveying arrangements form the intervention between two successive products in the product stream; and     movable stopper arrangements for the products, wherein the stopper arrangements cooperate with the control arrangements in such a way that the stopper arrangements are moved into a conveying area of the supplying arrangements in order to cause the products in the product stream to contact one another in the accumulation, and in such a way that the stopper arrangements are subsequently moved out from the conveying area of the supplying arrangements in order to cause the product stream to be conveyed further and to be released for the intervention of the driver arrangements between at least two successive products in the product stream.

16. A device for conveying lumpy products in such a way that the products are separated from a plurality of product streams and are subsequently conveyed further spaced apart from each other uniformly in at least one group, the device comprising a plurality of tracks, each track conveying one product stream, each track comprising:

supplying arrangements for supplying the products as a single-row product stream, wherein the respective supplying arrangements of the plurality of tracks are arranged side by side and substantially parallel to one another, wherein the products are separated from the product streams on each of the tracks and are subsequently conveyed further spaced apart uniformly in the at least one group;

discharging arrangements for discharging the products spaced apart from one another in a row, wherein the discharging arrangements are arranged after the supplying arrangements in a conveying direction of the products in such a way that the products are transferred from the supplying arrangements to the discharging arrangements;

conveying arrangements for conveying the products, wherein the conveying arrangements are arranged in a transfer area from the supplying arrangements to the discharging arrangements, and wherein the conveying arrangements have driver arrangements, which are mounted so as to be pivotable in a controlled manner in the conveying direction of the products and which form an intervention between at least two successive products in the respective product stream in such a way that, with a further movement of the conveying arrangements, said driver arrangements guide the products during the transfer from the supplying arrangements to the discharging arrangements in such a way that the products are separated from the respective product stream and are conveyed further at uniform distances from one another in at least one group, and are discharge, in a controlled manner in each case; and     control arrangements for controlling the conveying arrangements, the supplying arrangements, and the discharging arrangements such that the product streams on the plurality of tracks are synchronized with one another in such a way that, following the intervention between at least two products in the product streams, the products on a first track from the respective product stream are substantially aligned with the products on a second track, such that the products on the first track and the second track are arranged side by side substantially in a row in a direction perpendicular to the conveying direction of the products, wherein the conveying arrangements are circulating conveying arrangements, and wherein each of the circulating conveying arrangements has a dedicated drive, wherein each dedicated drive is not coupled to another dedicated drive, and wherein the control arrangements for controlling the conveying arrangements in the plurality of tracks cooperate with the supplying arrangements, the discharging arrangements and the circulating conveying arrangements in each of the tracks and control the conveying speeds thereof individually such that the products in each of the tracks, following intervention between at least two products in the respective product stream, are conveyed further at uniform distances from one another in the at least one group.

* * * * *